United States Patent [19]

Apri

[11] Patent Number: 4,550,951
[45] Date of Patent: Nov. 5, 1985

[54] MOMENTUM RESPONSIVE VEHICLE SHOULDER HARNESS LATCH

[76] Inventor: Edward W. Apri, 998 Lehigh St., Altadena, Calif. 91001

[21] Appl. No.: 467,512

[22] Filed: Feb. 18, 1983

[51] Int. Cl.⁴ .................. A62B 35/02; B60R 21/10
[52] U.S. Cl. .................. 297/480; 280/806; 297/470; 297/478
[58] Field of Search .......... 297/476, 478, 480, 470; 280/801, 806

[56] References Cited

U.S. PATENT DOCUMENTS

| | | | |
|---|---|---|---|
| 3,205,004 | 9/1965 | Spouge | 280/806 |
| 3,357,994 | 4/1968 | Wohlert et al. | 297/478 X |
| 3,588,173 | 1/1969 | Apri | 297/480 |
| 3,666,198 | 5/1972 | Neumann | 297/470 X |
| 3,790,099 | 2/1974 | Beller | 297/470 X |
| 3,847,434 | 11/1974 | Weman | 297/478 |
| 3,947,058 | 3/1976 | Laporte | 297/470 |
| 3,999,780 | 12/1976 | Matsuoka et al. | 297/470 |
| 4,208,770 | 6/1980 | Takada | 297/476 X |
| 4,394,034 | 7/1983 | Murphy et al. | 297/480 X |

FOREIGN PATENT DOCUMENTS

| | | | |
|---|---|---|---|
| 24812 | 3/1981 | European Pat. Off. | 280/801 |
| 56894 | 8/1982 | European Pat. Off. | 280/806 |
| 2529390 | 1/1976 | Fed. Rep. of Germany | 297/480 |
| 2729906 | 1/1978 | Fed. Rep. of Germany | 297/478 |

Primary Examiner—William E. Lyddane
Assistant Examiner—Peter R. Brown
Attorney, Agent, or Firm—Wm. Jacquet Gribble

[57] ABSTRACT

A latch housing attachable to a side wall of a vehicle frame holds a vertically movable cradle having a spring mounted sensing roller over which a loop or bight of a shoulder harness belt passes. The cradle is also spring mounted in the latch housing. The bottom portions of the facing walls of the cradle cavity in the housing converge to define a downwardly diminishing chamber into which a latch wedge fixed to the bottom of the cradle is movable by belt motion against the cradle spring force. The harness belt extends from each each end of the bight or loop to the take-up reel fixed to the vehicle and to the conventional lap belt near the lap belt buckle. The harness belt passes between the wedge faces and the adjacent faces of the Latch housing lower slanting walls so that swift momentum forces drive the wedge surfaces into binding contact with the belt runs but slower changes in belt momentum are absorbed by the roller mount springs, which are preferably adjustable.

5 Claims, 10 Drawing Figures

U.S. Patent  Nov. 5, 1985  Sheet 1 of 2  4,550,951
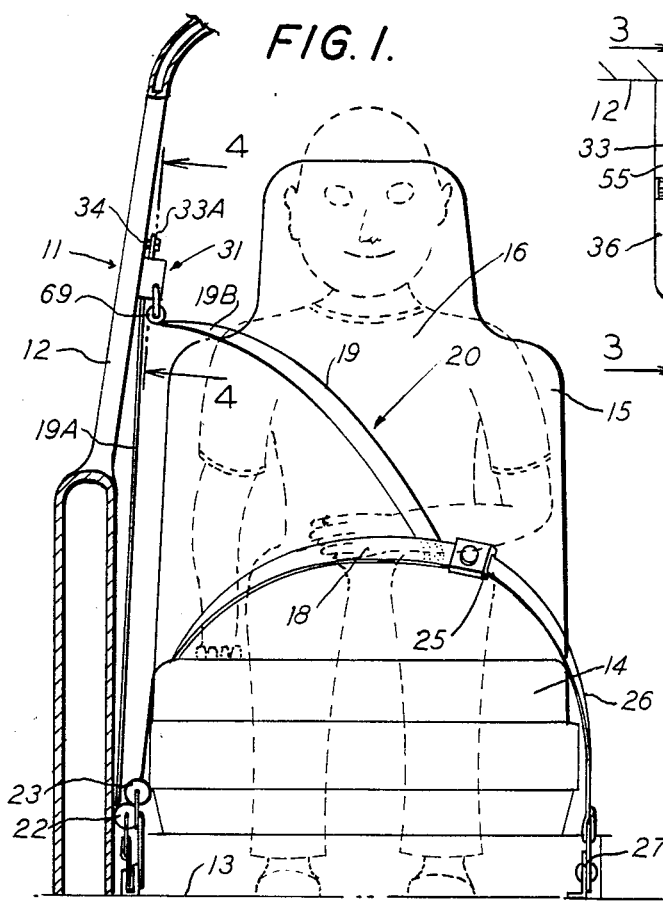
FIG. 1.
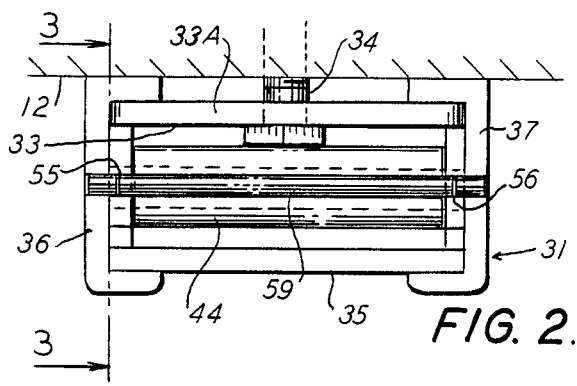
FIG. 2.
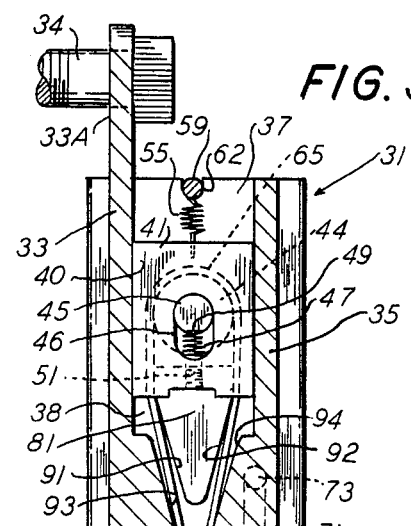
FIG. 3.
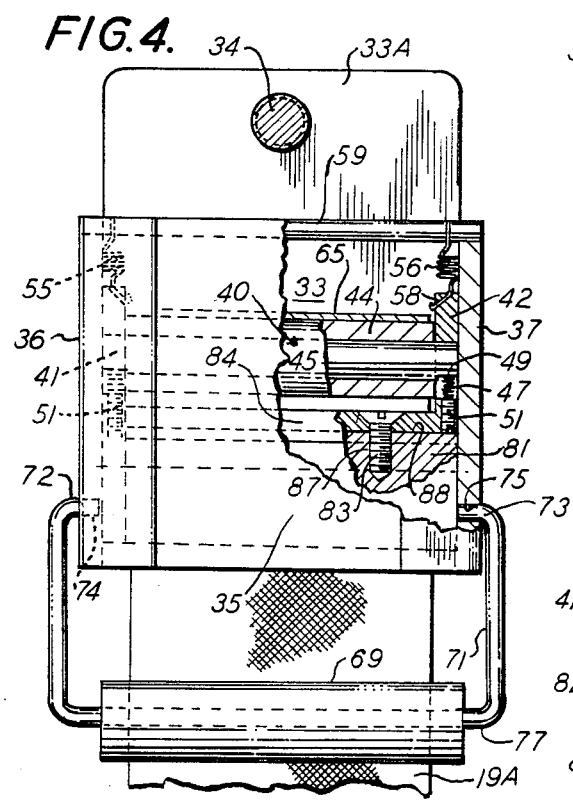
FIG. 4.
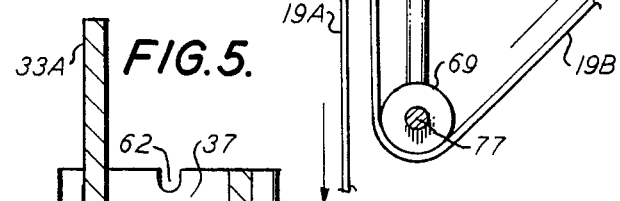
FIG. 5.
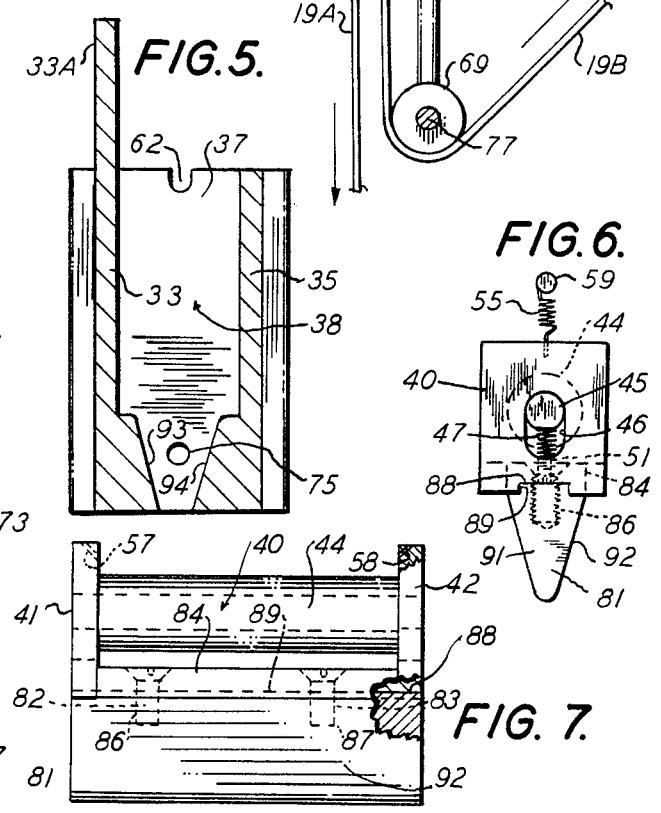
FIG. 6.
FIG. 7.

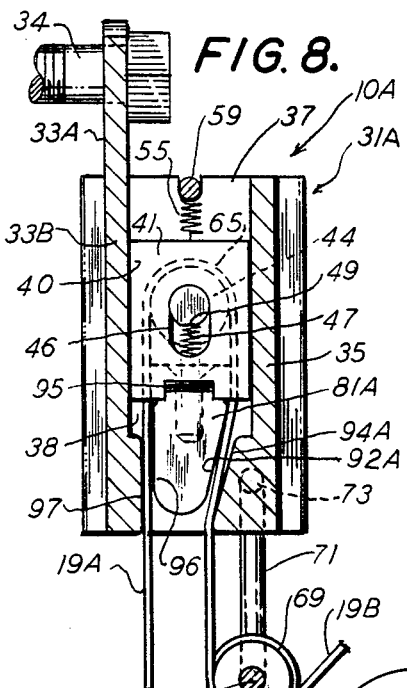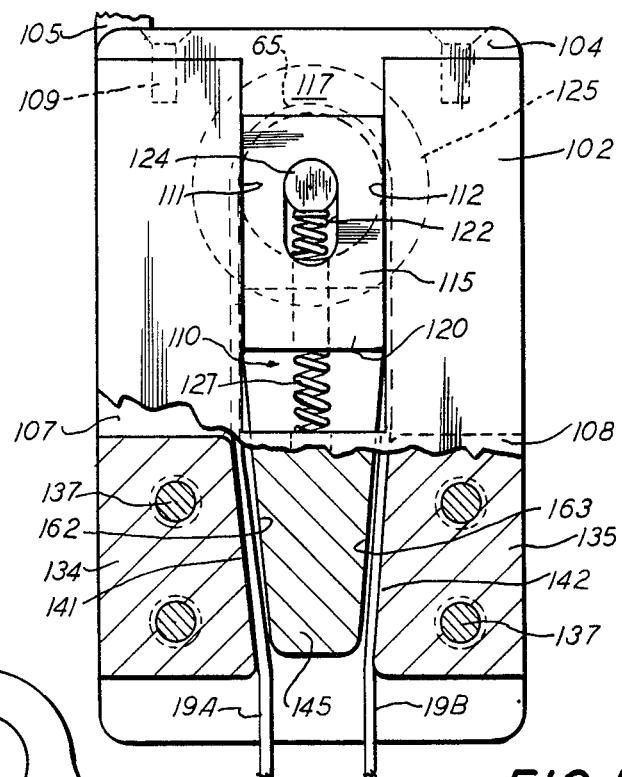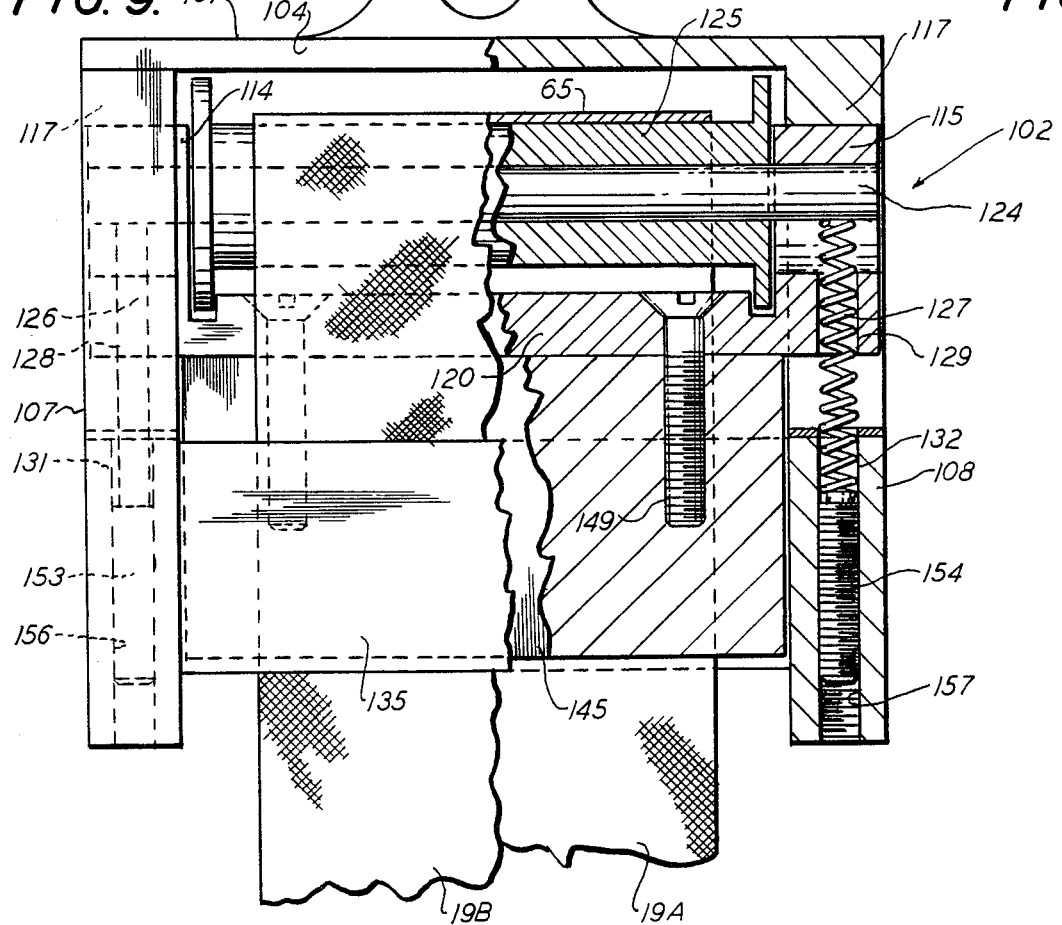

MOMENTUM RESPONSIVE VEHICLE SHOULDER HARNESS LATCH

BACKGROUND OF THE INVENTION

The invention relates to apparatus for providing limited motion freedom for passengers wearing seat belts or shoulder harnesses in vehicles. This invention was disclosed under the Document Disclosure Program as of Aug. 16, 1982, Document No. 110431. The objectives of the invention in part are similar to those defined in applicant's prior U.S. Pat. No. 3,419,308, issued Dec. 31, 1968 and entitled "Limited Motion Device for Shouler Harness and the Like", and U.S. Pat. No. 3,588,173, issued June 28, 1971 entitled "Momentum Actuated Harness". Like each of the patented devices, the present application defines apparatus by which an occupant is afforded the protection of secure motion restraint when a large momentum change occurs while having limited freedom of movement under small changes of momentum while engaged with the restraint harness. While many devices have been proffered the driving public in the U.S. in the past two decades that are responsive to momentum changes, none, including the highly touted, unlamented, air bags, has been accepted by or popular with drivers and riders. Most such mechanisms have been too cumbersome when worn and generally not employed by passengers when installed in vehicles. Other devices have been too complicated to be built within the price range acceptable to industry or the buying public. One particular problem with existing seat belt restraints is that, above a predetermined force level, they are substantially unyielding. Accordingly the passenger may be injured by the high forces of his body against the fixed and substantially rigid restraining belt.

I have invented a momentum responsive latch for use with a restraint harness combining seat and shoulder belts that is easy to use, occupies little space within the passenger compartment and is compatible with conventional harnesses now in use. The latch mechanism is simple to fabricate and install and needs little explanation for proper use by vehicle occupants. I have also discovered that, by providing an arrangement for permitting slight limited release of the restraining belt at very high force levels, injury to the passengers may be reduced, while still restraining the driver and passenger against impact against the dashboard, windshield or other parts of the vehicle.

SUMMARY OF THE INVENTION

The invention comprises a latch housing which is securable to an inner wall of a vehicle side frame adjacent to the connected shoulder and lap belts. Each belt is attached to a supply reel fixed to the vehicle floor, with the shoulder harness belt being fixed to the lap belt which is in turn secured releasably to the vehicle floor on a side of the seat opposite the supply reels. The latch housing contains a vertically movable cradle in which a motion sensing roller is mounted. A bight of the shoulder harness passes over the sensing roller between the reel and the seat belt juncture. Springs mount the cradle within the latch housing. Other springs may mount the axle of the sensing roller within the cradle. The shoulder belt runs from its reel and over the roller, through the latch housing and across the chest or a rider to be fixed to the lap belt. A latch wedge on the cradle is movable in the housing between in and out runs of the shoulder belt. A side wall defining the latch housing volume in which the cradle operates has a lower slanting portion approximately parallel to the adjacent wedge surface, a run of the belt passing between each of the adjacent surfaces of the wedge and the side wall. The slanting side wall portion slants inwardly at the bottom where the belt enters or emerges to diminish the housing volume to that location.

As the wearer of the harness moves slowly in the rider compartment under restraint by the harness, a load is transmitted to the sensing roller, the load of such small or slow motion being absorbed by the cradle springs and by rotation of the roller in the cradle. More forceful motion of the rider exceeds the force absorbsion capacity of the springs and results in the roller impinging upon the cradle which moves downwardly against its springs, carrying the wedge into contact with the belt runs and emphatically urging the wedge and belt runs into restraining contact with the side walls and the slanting portion thereof, securing the passenger in relation in the seat.

In accordance with another aspect of the invention, apparatus is provided that may be said to (1) permit free adjustment of the belt at very low forces, (2) hold the belt substantially against movement at substantial force levels, such as during a low velocity collision, and (3) permit limited and controlled movement of the belt at higher force levels such as when the vehicle has a relatively high velocity collision. This versatility is accomplished by the mating wedge and spring biasing arrangement as set forth in greater detail elsewhere.

The inventive apparatus is effective, adjustable, inexpensive to make and install and requires little training for use. These and other advantages of the invention are apparent from the following detailed description and drawing.

BRIEF DESCRIPTION OF THE DRAWING

FIG. 1 is a schematic front elevational view of a passenger restraint apparatus having a latch in accordance with the invention;

FIG. 2 is a plan view of the latch housing thereof in place in an occupied vehicle;

FIG. 3 is a sectional elevational view taken along line 3—3 of FIG. 2;

FIG. 4 is a side elevational view, partly broken away, and taken along line 4—4 of FIG. 1;

FIG. 5 is a transverse sectional elevational view of the latch housing of the apparatus of the invention;

FIG. 6 is an end elevational view of the latch cradle;

FIG. 7 is a side elevational view, partly broken away, of the latch cradle;

FIG. 8 is a transverse sectional elevational view of an alternate embodiment of the invention having an alternative wedge form;

FIG. 9 is a front elevational view, partly in section, of a further alternate embodiment of the invention; and FIG. 10 is an end elevational view, partly in section, of the embodiment of FIG. 9.

In the various Figures like parts are designated by like numbers.

DESCRIPTION OF THE PREFERRED EMBODIMENTS

In FIG. 1 latch 10 of the invention is shown in a vehicle 11 with a frame side 12 and a floor 13, schematically displayed. A seat with a cushion 14 and a back 15 supports a rider 16 shown in broken lines. The rider is restrained with respect to the seat by a lap belt 18 and a shoulder belt 19, the two belts defining a restraint harness 20. Each belt is secured near the passenger door to one of supply reels 22, 23. Lap belt 18 extends from reel 23 across the rider's lap to a quick release buckle 25 from which a lap belt portion 26 extends to a floor anchor 27 between the front seats, as is conventional.

Shoulder belt 19 extends from its reel 22 upwardly to a latch housing 31 through which belt 19 loops to continue across the shoulder and chest of rider 16 to a junction point with the lap belt near the quick release buckle. By unlatching the lap belt buckle the rider is released from the restraint of both lap and shoulder belts.

As can be seen in FIGS. 1, 2 and 3, latch housing 31 has a back wall 33 with a tongue 33A extending above the rest of the housing to accommodate an anchor bolt 34 which may be fixed conventionally in the vehicle side frame 12. The latch housing further comprises a front wall 35 parallel to, and spaced transversely from, back wall 33 and restricted in extent by longitudinally separated end walls 36, 37 of the same vertical extent as front wall 35. A cradle volume 38 is defined by the described walls, with a sensing cradle 40 lodged within the volume. End panels 41, 42 of cradle 40 journal a roller 44 whose reduced diameter axle 45 is supported at its ends in slots 46 in the cradle panels on compression springs 47 which thrust upon axle flats like the flat 49 of FIGS. 3 and 4.

The tension load of the springs 47 is variable by means of vertical screws 51, one of which bears against the bottom of each of the compression springs in slots 46. The screws are threadably engaged in tapped holes in the cradle accessible from the bottom of the cradle when the wedge is removed. Since the action of the latch depends upon the relative response of the spring loaded roller to the spring loaded cradle, the balance between the loads of the springs 47 (compression) and a pair of extension springs 55, 56 tied to the cradle end panels in slits 57, 58 and looped over a support rod 59 resting in locator notches 61, 62 of the end panels is important to latch operation, relative loading of the compression and extension springs must be afforded beyond the accuracy available from load design parameters of the springs alone. However, once set the calibration need not be changed during the period of use.

In FIGS. 3 and 4 it can be seen that the bight 65 of shoulder belt 19 passes around cradle roller 44, with a shoulder belt portion 19A running to supply reel 22 and a second belt portion 19B passing from the latch housing to a suspended roller 69 and then across the shoulder and chest of passenger 16 to the seat belt juncture. A loop bracket 71 supports the belt roller 69 from the latch housing. Bracket arm ends 72, 73 seat in recesses 74, 75, respectively of the latch housing walls 36, 37. An axle portion 77 of the bracket journals the suspended roller, which acts as a guide roller for the belt in its path away from the latch housing.

Turning to FIGS. 3 and 4, an elongate wedge 81 can be seen to be fastened to the lower portion of cradle 40. Screws 82, 83 seated in a yoke 84 of the cradle engage tapped holes 86, 87 of the wedge. The yoke extends longitudinally between the cradle end panels 41, 42. The screws are accessible when roller 44 is not in place in the cradle. The wedge has an abutting rib 88 seated against the cradle yoke in a longitudinal groove 89 of the yoke. The wedge is centered on the cradle so that the converging side surfaces 91, 92 of the wedge are always equidistant from slanting lower wall faces 93, 94 of the front and back walls of latch housing 31. Faces 91, 92 converge downwardly at an angle equal to, or within one degree of, the angle of the lower wall faces 93, 94. Thus when rapid momentum or force changes take place and are conveyed through the restraint harness to roller 44 and cradle 40, the cradle and wedge are moved downwardly within volume 38, binding the belt runs of the shoulder belt between the walls and both faces on both sides of the wedge to latch effectively the belt against movement. When the momentum change load dissipates, springs 55, 56 withdraw the cradle upwardly and attached wedge 81 follows in volume 38 to release the belt harness from latched condition and restore to the rider the freedom of small, slow movements while still within the harness.

It has been found that smoothly machined aluminum is best suited to effective operation of the inventive devices, and it is therefore preferable that this material be used to achieve responsive performance of the devices. The quality of the machined finish has been found to affect operational reliability, so that the clamping faces and surfaces are machined to close tolerances. Standard seat belt material may be used in conjunction with the inventive latches. Since the belt and harness securing means may also be conventional with the exception of the latches, conversion of existing harness systems to the inventive apparatus is simple, as is installation in new vehicles.

While the preferred embodiment of the invention employs a v-shaped wedge as illustrated in FIGS. 1 through 7, the invention does not preclude the use of a wedge having a single slanting surface, as shown in the embodiment of FIG. 8. As shown in that Figure, a wedge 81A has a vertical face 96 parallel to the vertical wall 97 of a back wall 33B of a latch 10A. The opposite wedge face 92A is slanted similarly to the surface 92 of the wedge 81 of the FIG. 1 embodiment, and slanting surface 94A of lower wall portion of front wall 35 is similar to the like wall portion of the FIG. 1 embodiment. The belt bight runs 19A and 19B extend between the parallel surfaces of the respective wall surfaces and wedge faces as in the first described embodiment. However, the embodiment of FIG. 8 may have a plurality of shims 95 between the mating surfaces of the cradle groove 89 and the wedge rib 88 for adjusting wedge penetration.

FIGS. 9 and 10 illustrate an alternate embodiment of the invention wherein a latch 101 has a latch housing 102 with a top 104 from which an ear 33D extends to receive a fastener 34 (not shown) to fix the latch to the vehicle. At each end of the latch housing are relatively heavy guide walls 107, 108 fixed to the top by standard fasteners 109. Each guide wall has a central upper slot 110 defined by spaced vertical surfaces 111, 112 between which end panels 114, 115 of a roller cradle 120 reside. A tab 117 at each end of the top registers in the slots 110 to close the slot top. Each cradle end panel has an elongate opening 122 receiving an end of a roller axle 124. A roller spool 125 is journalled on the axle to receive bight 65 of a seat belt with bight runs 19A, 19B. The axle is free to move vertically within openings 122 under the load of vertical compression springs 126, 127 lodged in bores 128, 129 of the cradle end panels and in recesses 131, 132 of transversely spaced longitudinal blocks 134, 135 fixed between guide walls 107, 108 by standard fasteners 137 of FIG. 10.

Each of the longitudinal blocks has an inner surface slanting toward the central longitudinal vertical plane of the latch housing. Block 134 has a slanting surface 141 and block 135 has a slanting surface 142. The surfaces extend longitudinally of the housing and define with the walls and guides a housing volume 38A which is reduced by slanting surfaces 141, 142. A wedge 145 is fixed to the bottom of the cradle by screws 149 of FIG. 9. Although not shown, shims like those of FIG. 8 may be used to adjust the extent of the wedge below the cradle.

As can be seen from FIG. 9, springs 126, 127 bear against axle 124 at their tops and against adjustment screws 153, 154 at their bottoms. Adjustment of the screws 153, 154 in the threaded bores 156, 157 of the guide walls 107, 108 regulates the force needed to bring the cradle and its wedge down into housing volume 160 enough to clamp the wedges slanting faces 162, 163 against the runs 19A and 19B of the belt bight to bind the runs against the slanting surfaces 141, 142 of the longitudinal blocks to arrest the motion of the runs through the housing around the roller 65A.

The embodiment of the FIGS. 1 through 7 can be fabricated on a smaller scale than the embodiment of FIGS. 9 and 10, which is shown to an enlarged scale in those Figures, because the first embodiment employes the two sets of springs to support the cradle and roller, and the side walls of the first embodiment can therefore be thinner. However, where a somewhat larger latch housing is not objectionable, the embodiment of FIG. 9 may be used with its thicker side walls to accommodate the larger single spring set.

Other apparatus and arrangements may be provided for implementing the concept of the three force cycles mentioned above, that is, free movement of the restraining belt, whether simple lap or shoulder harness, at low force levels; substantially firm holding of the belt at intermediate force levels; and limited and controlled movement of the belt at high force levels to preclude injury to the users of the belts; and these functions may be accomplished using suitable rollers, springs and frictional elements in other configurations than those shown and described, although the mating wedge arrangements as disclosed are to be preferred.

The invention has been explained with reference to particular embodiments. Other variations within the scope of the invention may occur to those skilled in this art. Therefore it is desired that the invention be measured by the appended claims.

I claim:

1. In a momentum responsive shoulder harness apparatus for use in securing a passenger with respect to a seat in a vehicle having side walls and a floor to which the seat is secured and having a lap belt fixed at one end to the vehicle and releasably secured to a lap belt portion extending from a first belt take-up reel fixed to the vehicle and a shoulder harness belt secured at one end to said lap belt and at its other end to a second take-up reel fixed to the vehicle, the combination comprising a belt arresting latch, a latch housing securable to a wall of the vehicle at a point displaced from the passenger seat, said latch housing having a back wall adapted ti be fixed to a vehicle side wall, a front wall spaced from the back wall away from the vehicle wall, latch housing end walls spaced from each other and at right angles to the back and front housing walls, said front, back and end walls defining a housing volume adapted to contain a bight of the shoulder harness belt between the lap belt and the second take-up reel, a roller over which said bight passes within said housing, a roller cradle in the housing volume supporting the roller, first resilient means in the cradle journalling said roller, a slanting back wall portion a slanting front wall portion, said slanting wall portions tending to converge at the bottom of said housing, a wedge fixed to said cradle and diminishing toward the bottom of the housing, portions of the harness bight passing on opposite sides of the wedge between the wedge and the back and front wall slanting portions such that downward displacement of the wedge between said slanting wall portions imposes a binding force upon said shoulder harness belt within the latch housing, second resilient means suspending said cradle and wedge within the housing volume, the resistance to force of said first and second resilient means being of different degree, whereby to provide free adjustment of the belt at low forces and controlled movement of the belt at higher forces and substantially no movement of the belt at substantial force levels.

2. Apparatus in accordance with claim 1 further complrising threaded member bearing against said compression spring and adjustable to vary the force applied to the compression spring to change its resistant capacity to force.

3. Apparatus in accordance with claim 1 wherein said cradle further comprises a spring bar extending between and supported by said housing end walls, and a pair of spaced extension springs secured on the bar at one end and secured to the cradle at the other end.

4. Apparatus in accordance with claim 1 wherein said slanting front and back wall portions are machine finished for smoothness and said wedge has converging wall surfaces each parallel to an adjacent slanting wall, said slanting wall surfaces being machine finished for smoothness.

5. Apparatus in accordance with claim 4 wherein the degree of parallelness between a slanting wall and an adjacent wedge surface diverges by no more than one degree.

* * * * *